US012583667B2

(12) United States Patent
Schunk

(10) Patent No.: US 12,583,667 B2
(45) Date of Patent: Mar. 24, 2026

(54) STORAGE TANK ISOLATION SYSTEM

(71) Applicant: Jeff Ray Schunk, Mason, MI (US)

(72) Inventor: Jeff Ray Schunk, Mason, MI (US)

( * ) Notice: Subject to any disclaimer, the term of this patent is extended or adjusted under 35 U.S.C. 154(b) by 0 days.

(21) Appl. No.: 18/790,915

(22) Filed: Jul. 31, 2024

(65) Prior Publication Data

US 2024/0391689 A1 Nov. 28, 2024

Related U.S. Application Data

(63) Continuation of application No. 17/000,525, filed on Aug. 24, 2020, now Pat. No. 12,054,337.

(60) Provisional application No. 62/892,072, filed on Aug. 27, 2019.

(51) Int. Cl.
| | |
|---|---|
| *B65D 90/28* | (2006.01) |
| *B65D 90/54* | (2006.01) |
| *F16K 17/04* | (2006.01) |
| *F16K 27/02* | (2006.01) |
| *F16K 31/52* | (2006.01) |
| *F16L 23/036* | (2006.01) |

(52) U.S. Cl.
CPC ............. B65D 90/28 (2013.01); B65D 90/54 (2013.01); F16K 17/0413 (2013.01); F16K 27/0209 (2013.01); F16K 31/52 (2013.01); F16L 23/036 (2013.01); B65D 2590/542 (2013.01)

(58) Field of Classification Search
CPC .. B65D 90/28; B65D 90/54; B65D 2590/542; F16K 17/0413; F16K 27/0209; F16K 31/52; F16L 23/036
See application file for complete search history.

(56) References Cited

U.S. PATENT DOCUMENTS

| | | | | |
|---|---|---|---|---|
| 802,001 | A | 10/1905 | Lorenz | |
| 1,026,542 | A | 5/1912 | Womelsdorf | |
| 1,300,224 | A | 4/1919 | Rood | |
| 2,803,424 | A * | 8/1957 | Mccabe | ................. F16K 15/06 |
| | | | | 137/454.2 |
| 3,199,879 | A | 8/1965 | Fleming | |
| 4,076,142 | A | 2/1978 | Naz | |
| 4,116,352 | A | 9/1978 | Davis | |
| 4,278,487 | A | 7/1981 | Hormanns | |
| 4,440,407 | A | 4/1984 | Gagas | |
| 4,928,615 | A | 5/1990 | Williams | |
| 5,135,024 | A * | 8/1992 | LeBlanc | ............... F16K 15/063 |
| | | | | 137/543.17 |
| 5,715,965 | A | 2/1998 | Goulding | |
| 6,021,912 | A | 2/2000 | Hertrampf | |
| 6,024,246 | A | 2/2000 | Huang | |
| 6,050,199 | A | 4/2000 | Anderson et al. | |
| 6,527,476 | B1 | 3/2003 | Pettesch | |

(Continued)

*Primary Examiner* — P. Macade Nichols
(74) *Attorney, Agent, or Firm* — Young Basile Hanlon & MacFarlane, P.C.

(57) ABSTRACT

A storage tank hatch isolation system for a storage tank having a vertical riser attached to a top of the storage tank and having a cover with an aperture, a connecting member extending from a side of the vertical riser, a distal end of the connecting member being attached to a tank hatch, and a valve assembly assessable through the aperture in the cover, the valve assembly configured to be moved from an open position in which flow through the vertical riser to the connecting member is not obstructed, and a closed position in which flow through the vertical riser to the connecting member is obstructed.

20 Claims, 15 Drawing Sheets

(56)  References Cited

U.S. PATENT DOCUMENTS

| | | | |
|---|---|---|---|
| 6,779,672 | B2 | 8/2004 | Kano et al. |
| 7,032,905 | B2 | 4/2006 | Mullally |
| 7,866,040 | B2 | 1/2011 | Swensen et al. |
| 8,251,373 | B2 | 8/2012 | Lev et al. |
| 8,268,032 | B2 | 9/2012 | Eyers et al. |
| 8,608,021 | B2 | 12/2013 | Poulter |
| 2005/0184264 | A1 | 8/2005 | Tesluk et al. |
| 2013/0264341 | A1 | 10/2013 | Cockerham et al. |
| 2017/0074413 | A1 * | 3/2017 | Cockerham .......... F16K 17/196 |

* cited by examiner

STORAGE TANK ISOLATION SYSTEM

CROSS REFERENCE TO RELATED APPLICATION

This application is a continuation of U.S. patent application Ser. No. 17/000,525, filed on Aug. 24, 2020, which claims priority to and the benefit of U.S. Provisional Application Patent Ser. No. 62/892,072, filed Aug. 27, 2019, the entire disclosures of which are hereby incorporated by reference.

TECHNICAL FIELD

The present disclosure relates to fluid storage tank hatches, and more particularly to isolation valve assemblies that can provide pressure relief and access to storage tank hatch and storage tank liquid levels.

BACKGROUND

Storage tanks used to store industrial oils and other fluids (e.g., liquids and gasses) must be properly sealed to prevent leakage of vapors contained within the storage tanks. The fluids can contain volatile compounds such as hydro carbons or other contaminants which, if released, can harm the environment or persons handling the storage tanks. Oil/condensate storage tanks are set up with all common head spaces. Storage tank batteries can have anywhere from 4 to 30 storage tanks, as an example. Emissions loss from these storage tank batteries can be very small if the storage tanks and hatches are properly maintained. However, when a storage hatch needs to be repaired or replaced, the emissions can be significant, particularly when the storage tanks are under pressure. Companies can face government penalties for emissions.

Storage tanks are usually accessed by way of a hatch commonly known as a "thief hatch." The base of the hatch is affixed to the body of the storage tank and includes an opening providing access to the contents of the storage tank. The hatch is closed using a cover, which typically produces a seal by means of a rubber gasket that compresses against the base. These hatches can fail for a variety of reasons, requiring maintenance or replacement. For example, hatches typically used with fluid storage tanks are difficult to keep adequately sealed and are a common source of storage tank leaks. The reason is that the point of contact between the gasket and the base is at a rim of the base surrounding the base's opening, which rim has a tendency to become worn or pitted over time and use. Due to the rim's wear and tear, the gasket may fail to engage evenly against the base. Gaps caused by the uneven compression will allow vapors to escape. Maintenance or replacement would be required. Maintenance and replacement can be hazardous to both the environment and those working on the hatch, as the gasses in the storage tank will be released. Personnel conducting the repair may be exposed to the harmful vapors released from the storage tank during the remediation process. Often, the entire storage tank must be discarded because of the faulty hatch.

It would be desirable to have a system that could mitigate leakage of harmful vapors while hatches are being tested. It would be desirable to have a system that protects the integrity of storage tank. It would be desirable to have a system that provides a safe technique for employees to test the fluid contents of the hatch or the storage tank.

SUMMARY

This disclosure relates to a storage tank hatch isolation system for a storage tank including a vertical riser attached to a top of the storage tank and having a cover with an aperture and a connecting member extending from a side of the vertical riser. A distal end of the connecting member is parallel to the top of the storage tank, and the distal end is attached to a storage hatch. The storage isolation system includes a valve assembly that includes a stem extending through the aperture in the cover, a valve plate attached to the stem, and a valve seat sealed to the vertical riser at a position below a connection to the connecting member. The valve plate moves with the stem from an open position in which the valve plate is held within the vertical riser at a position equal to or above the connection to the connecting member and a closed position in which the valve plate is on the valve seat to isolate the storage tank. The stem may include a second cover that is openable and interfaced with the distal end of the stem. The stem may be hollow so that, when the second cover is open, a safety relieve valve is interfaceable to test contents of the storage tank. The storage tank isolation system may further include an intermediate connector fluidly connecting the vertical riser and the storage tank so that the vertical riser and the storage tank are spaced a distance apart. The storage hatch may include a pressure relief valve that releases vapors from the storage tank at a pressure threshold, and when the valve assembly is in the closed position, the storage hatch, the pressure relief valve, or both are testable, replaceable, or repairable without releasing vapors from the storage tank. The stem may be sealed and extendable into the storage tank so that contents of the storage tank are testable without releasing any vapors. The intermediate connector and the vertical riser may each include flanges that align edges of the intermediate connector and edges of the vertical riser, and the intermediate connector and the vertical riser may be connected by one or more clamps that are configured to seal the flanges of the intermediate connector and the vertical riser. The vertical riser may include flanges on the distal end of the vertical riser, and the flanges may align edges of edges of the vertical riser and edges of the cover so that the valve plate is aligned with the valve seat when the stem is interfaced with the aperture. The cover and the vertical riser may be connected by one or more clamps that seal the vertical riser and the cover. The stem and the valve seat may be threadedly connected so that, when the valve plate is in contact with the valve seat, rotating the stem creates a tight seal. The vertical riser may include a seal assembly threadedly interfaced with the stem at the aperture so that vapors are sealed within the storage tank isolation system. The storage tank isolation assembly may further include an isolation valve contacting an external surface of the intermediate connector that tests fluids of the storage tank isolation system, the storage tank, or both.

This disclosure also relates to a storage tank isolation system for a storage tank that includes a vertical riser attached to a top of the storage tank and having a cover with an aperture and a connecting member extending from a side of the vertical riser. A distal end of the connecting member is parallel to the top of the storage tank, and the distal end is attached to a storage hatch. The storage isolation system includes a valve assembly that includes a stem extending through the aperture in the cover and a valve plate attached to a proximate end of the stem. The valve assembly includes a valve seat sealed to the vertical riser at a position below a connection to the connecting member. A lever assembly is fixed around the stem on a position above the valve seat and moves the stem from an open position in which the valve plate is held within the vertical riser at a position above the connection to the connecting member and a closed position in which the valve plate is on the valve seat to isolate the storage tank. The lever assembly may include a fixed collar contacting a portion of the stem, a rail path with a sliding connection on the fixed collar, and a lever contacting the rail path and configured to slide the rail path along the fixed collar. When the lever slides the rail path along the fixed collar, the stem may be movable between the open position and the closed position. The lever assembly may include a fixed collar contacting a portion of the stem, a spring latch secured to a top surface of the cover, and a lever contacting the fixed collar and configured move the fixed collar on the spring latch between a secured position and an unsecured position. The secured position may be associated with the open position of the stem, and the unsecured position may be associated with the closed position of the stem. The storage tank isolation system may include a seal assembly threadedly securing the stem and the aperture so that releasing vapors is prevented through the aperture when the stem is moved between the open position and the closed position.

This disclosure also relates to a storage tank isolation system for a storage tank that includes a vertical riser attached to a top of the storage tank and having a cover with an aperture and a connecting member extending from a side of the vertical riser. A distal end of the connecting member is parallel to the top of the storage tank, and the distal end is attached to a storage hatch. The storage tank isolation system includes a valve assembly that includes a stem extending through the aperture in the cover and a valve plate attached to the stem. The valve assembly includes a valve seat sealed to the vertical riser at a position below a connection to the connecting member and a fixed portion sealed to the vertical riser at a position above the connection to the connection member. The valve assembly includes a check plate rotatably connected to the fixed portion and configured to be openable so that the stem is passable through the fixed portion. The valve plate moves with the stem from an open position in which the valve plate is held at a position above the fixed portion and the check plate and a closed position in which the valve plate is on the valve seat to isolate the storage tank. The valve assembly may further include a hinge portion that assists the check plate rotate relative to the fixed portion; and a retainer ring that provides a disconnectable fluid seal between the fixed portion and the check plate. The vertical riser further includes an equalizing valve secured to an external wall of vertical riser at a position below the cover and above the connection to the connecting member. The fixed portion may be circular rim extending along the inside walls the vertical riser, and the check plate may be off centered relative to a central axis of the fixed portion, the vertical riser, or both. When the check plate is in the closed position, the stem, the cover, the valve plate, or any combination thereof are removeable without releasing any vapors from the storage tank so that the stem, the cover, the valve plate, or any combination thereof are inspectable.

This disclosure also relates to a storage tank hatch isolation system for a storage tank having a vertical riser attached to a top of the storage tank and having a cover with an aperture, a connecting member extending from a side of the vertical riser, a distal end of the connecting member being attached to a tank hatch, and a valve assembly assessable through the aperture in the cover, the valve assembly configured to be moved from an open position in which flow through the vertical riser to the connecting member is not obstructed, and a closed position in which flow through the vertical riser to the connecting member is obstructed.

BRIEF DESCRIPTION OF THE DRAWINGS

The description herein makes reference to the accompanying drawings wherein like reference numerals refer to like parts throughout the several views, and wherein.

DETAILED DESCRIPTION

Disclosed herein are embodiments of a storage tank isolation system, or a hatch swapper. Several embodiments of the claimed invention are disclosed. It is to be understood that the instant disclosure is not intended to be limited to these embodiments; on the contrary, the disclosure is intended to cover various modifications and arrangements, depending on the particular geometry of the hatch used, without departing from the spirit and scope of the appended claims.

The present disclosure provides a storage tank isolation system that seals the storage tank so that the storage tank can be tested, repaired, or replaced in an isolated environment. The present disclosure provides a storage tank isolation system that provides an isolated assembly, apart from the storage tank, that makes the hatch inspectable and allows the integrity of the hatch to be tested for leakage of vapors independently of the storage tank. The present disclosure provides a storage tank isolation system that provides an isolation technique in combination with a technique for testing the fluid content of the storage tank without opening the hatch.

Figure 1:
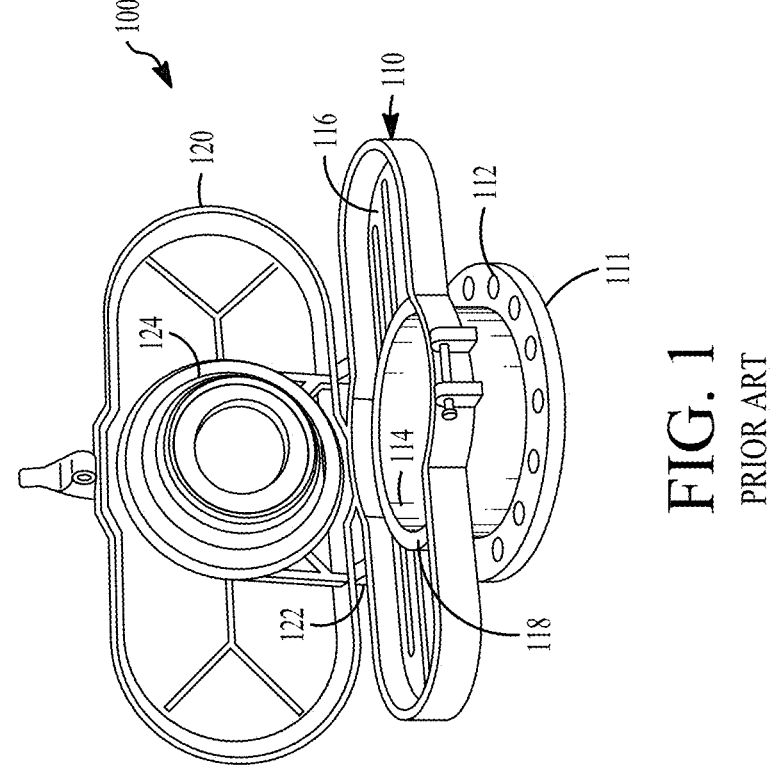
FIG. 1 is a perspective view of an example prior art hatch system.

FIG. 1 is an illustration of a prior art hatch assembly 100 for which the disclosed embodiments may be used. As depicted in FIG. 1, the hatch assembly 100 includes a hatch 110 and cover 120. The hatch 110 can be bolted or otherwise coupled to a fluid storage tank (not shown) with flange 111 having holes 112 provided for this purpose. The flange and holes, including number and spacing, is determined by the API storage tank requirements. The hatch 110 has a generally vertical internal perimeter 114 or neck defining an aperture that provides access to the fluid stored in the fluid storage tank. The hatch 110 in this example includes a plate 116 that is generally horizontal. A rim 118 defines the intersection of the internal perimeter 114 and the plate 116. Where the surface or plate 116 is absolutely horizontal and the internal perimeter 114 is absolutely vertical, this intersection may be a right angle. However, the rim 118 can also include a ridge or protrusion that rises slightly above the plate 116.

This example hatch assembly 100 also includes a cover 120 designed to close on the hatch 110 in a vapor-tight manner. The cover 120 and hatch 110 may be connected by means of a hinge 122. The cover 120 includes a gasket 124 (usually made of rubber or a rubber-like material) corresponding to the rim 118. Closing the hatch assembly 100 causes the gasket 124 to exert force on and compress against the rim 118, and such compression results in a seal between the hatch 110 and the cover 120.

Figure 2:
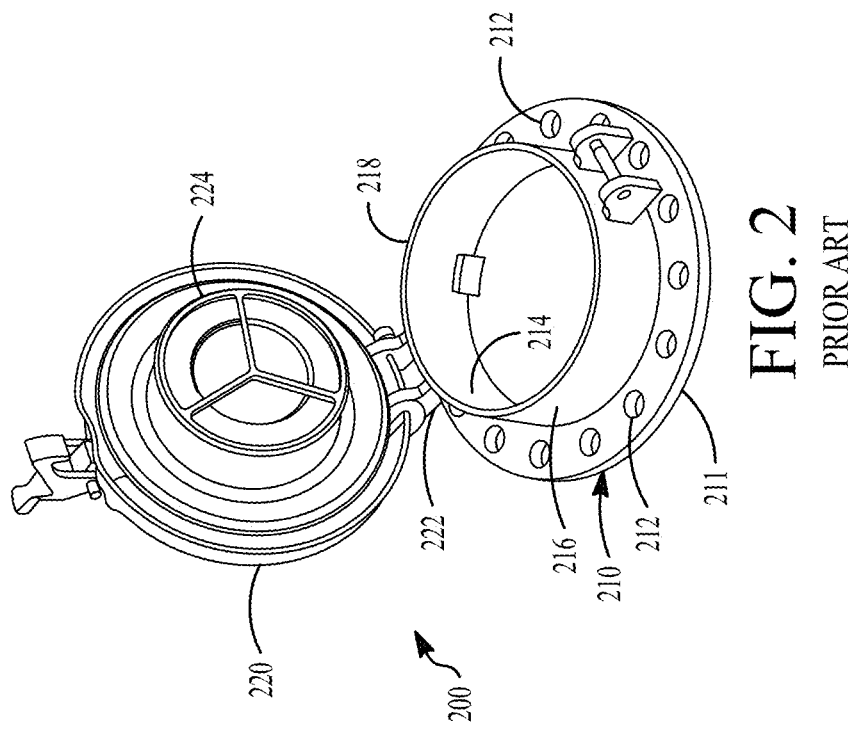
FIG. 2 is a perspective view of another example prior art hatch system.

FIG. 2 is a line drawing of another type of example prior art hatch assembly 200 that can also be used with the disclosed embodiments. As depicted in FIG. 2, the hatch assembly 200 includes a hatch 210 and a cover 220. The hatch 210 can be bolted or otherwise coupled to a fluid storage tank via flange 211 in which holes 212 are be provided. The hatch 210 has a neck or a generally vertical internal perimeter 214 defining an aperture providing access to the fluid stored in the fluid storage tank. The hatch 210 in this example has an external perimeter 216 opposite the internal perimeter 214, together forming a kind of neck. A rim 218 that is annular at the distal end of both the internal perimeter 214 and the external perimeter 216 defines the intersection between the two.

This example hatch assembly 200 also includes a cover 220 designed to close on the hatch 210 in a vapor-tight manner. The cover 220 and hatch 210 may be connected by means of a hinge 222. The cover 220 includes a (rubber or equivalent) gasket 224 corresponding to the rim 218. Closing the hatch assembly 200 causes the gasket 224 to exert force on and compress against the rim 218, and such compression results in a seal between the hatch 210 and the cover 220.

The hatches described with reference to FIGS. 1 and 2 currently do not allow for isolating the storage tank when the hatch requires maintenance or replacement, or the hatch's pressure relief valve or sealing efficiency requires testing. The storage tank isolation assemblies disclosed herein provide a means to isolate the storage tank from the hatch. Due to environmental laws and for reasons of safety, the storage tank typically has to be completely drained so that no vapors are released to the atmosphere when the hatch requires repair or replacement. This is time-consuming and costly. The storage tank isolation assemblies disclosed herein provide a means of isolating the storage tank without the need to drain the contents when the hatch needs to be repaired or replaced. Further, the storage tank isolation assemblies disclosed herein provide one or more means of testing the internal fluids of the storage tank isolation system 300, the storage tank, or both without releasing significant vapors to the environment.

Figure 3:
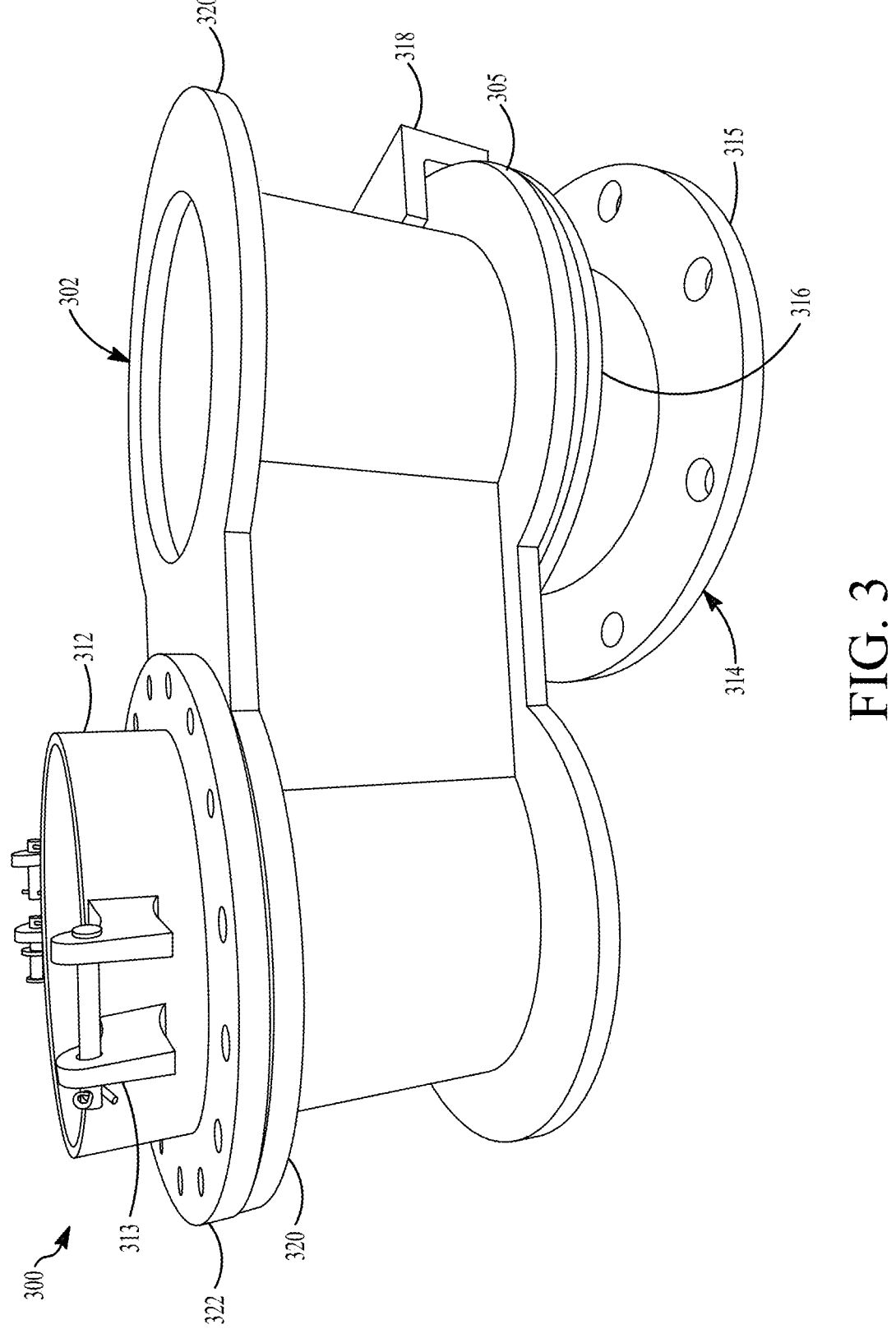
FIG. 3 is a perspective view of a storage tank isolation system as disclosed herein.

FIG. 3 is a perspective view of a storage tank isolation system 300 as disclosed herein. The storage tank isolation system 300 for an API storage tank is shown in FIGS. 3, 8, 9, and 15 and comprises a vertical riser 302 connected to the storage tank at a bottom end 304. From the vertical riser 302 extends a connecting member 306 that connects the vertical riser 302 to the hatch 308. The vertical riser 302 can have the same diameter as an opening 310 in the storage tank, as illustrated in FIGS. 3, 6, 7, 8 and 9, or can have a diameter larger than that of the opening 310 in the storage tank, as illustrated in FIG. 10. The diameter of the connecting member 306 will be the same diameter as the opening 312 of the hatch 308, which is typically about 8". The connecting member 306 extends horizontally, perpendicularly, laterally, away, or obliquely (i.e., at any angle at or between about 85 degrees to about 25 degrees) from the vertical riser 302 and has an elbow that positions the hatch 308 so that it is level as it would have been if mounted directly to the storage tank. However, the connecting member 306 may have any configuration that allows the hatch 308 to be isolated from the storage tank for testing, replacing, or repairing the hatch 308.

Figure 8:
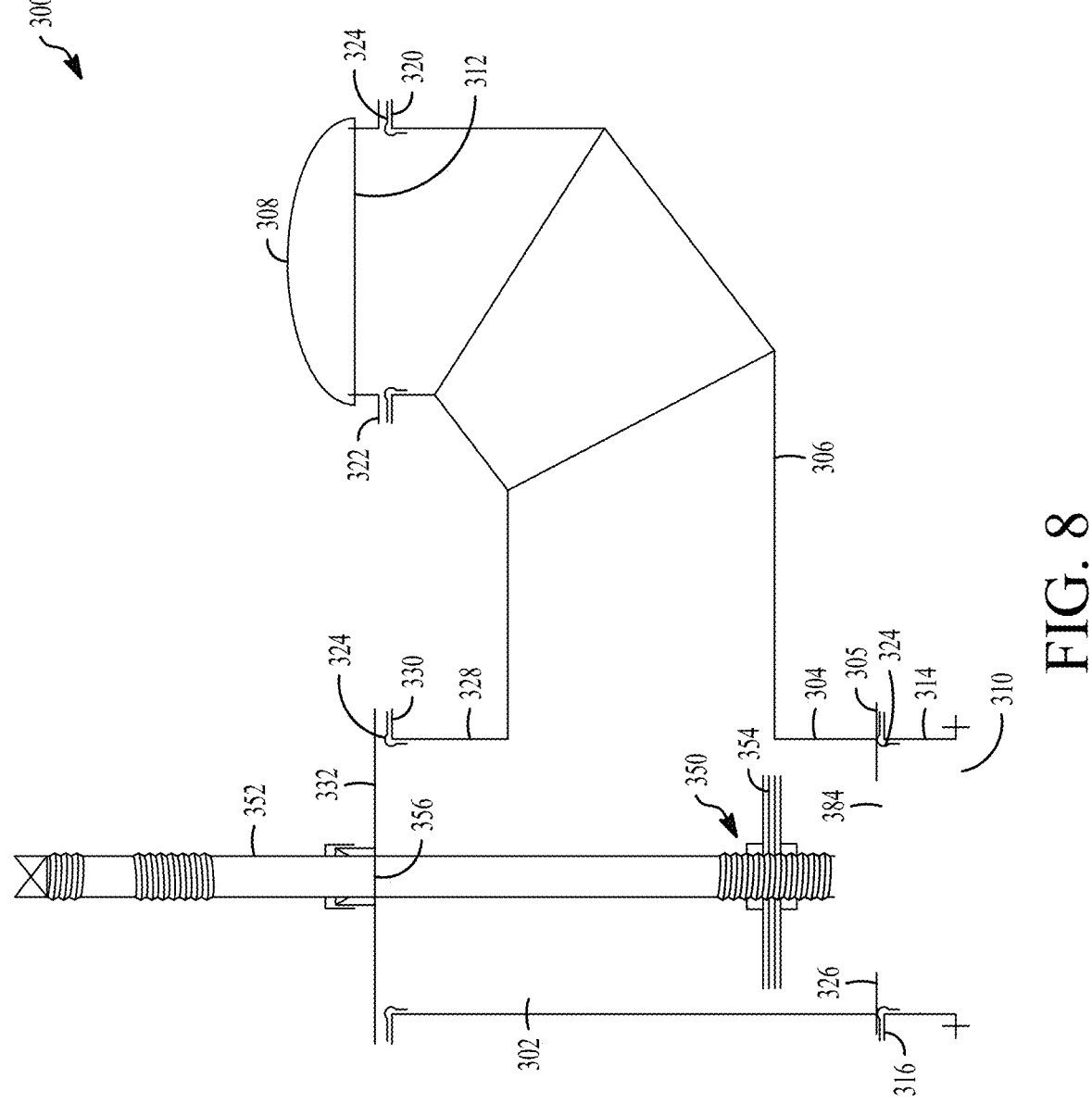
FIG. 8 is a cross-sectional view of a storage tank isolation system.

The vertical riser 302 is connected to and spaced a distance from the storage tank via an intermediate connector 314, as shown in FIGS. 3 and 8. The intermediate connector 314 is bolted or welded to the storage tank and has a flange 316, and the intermediate connector 314, the vertical riser 302, and the storage tank are in fluid connection with each other. The bottom end 304 of the vertical riser 302 has a flange 305. The flange 305 and the flange 316 of the intermediate connector 314 can each have holes that align to receive bolts to couple the two together, as illustrated in FIG. 4.

Figure 4:
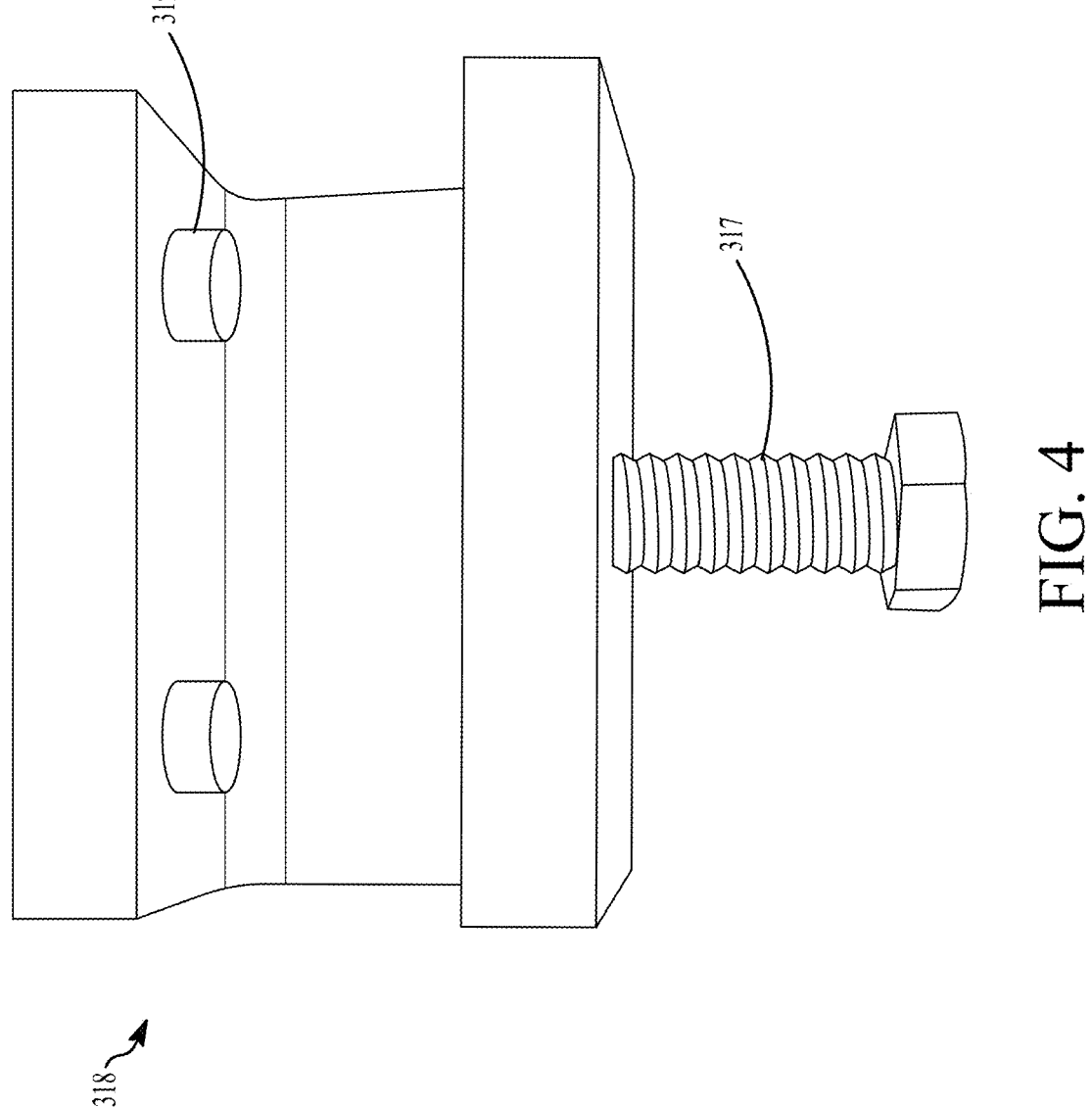
FIG. 4 is a perspective view of a clamp.

FIG. 4 is a perspective view of a clamp 318. The flanges 305, 316 are connected by a bolt 317 that compresses the clamp 318 for securing the two components together, as shown in FIG. 3. The clamp 318 can be a single clamp that circumscribes the entire flange 316 and flange 305 or can be multiple clamps. The clamp 318 can surround the entire circumference of one or more of the flanges 305, 316, or the clamp 318 may simply be secured over some of the edges of the flanges 305, 316. For example, as shown in FIG. 4, the clamp 318 utilizes a bolt 317 that compresses notches 319 into holes of one of the flanges 305, 316. The clamp 318 replaces the need for multiple bolted connections, which are typically sixteen bolt connections, which require a lot of time an effort to install and remove. Furthermore, over time, the nuts and bolts may degrade when directly contacting the flanges 305, 316 without the clamp 318 such that removing them is extremely difficult without the need for cutting them.

Figure 5:
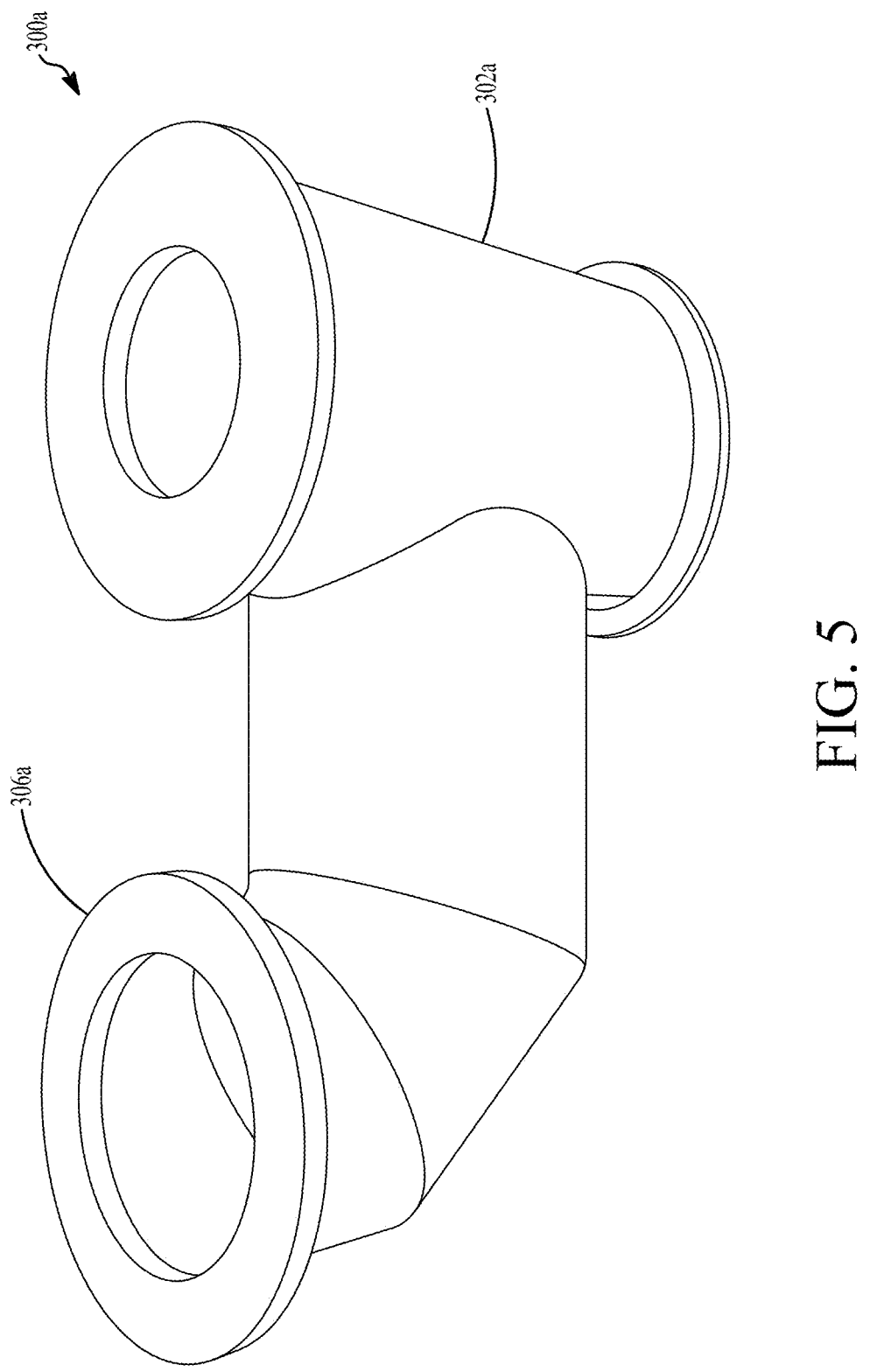
FIG. 5 is a perspective view of another storage tank isolation system.
Figure 6:
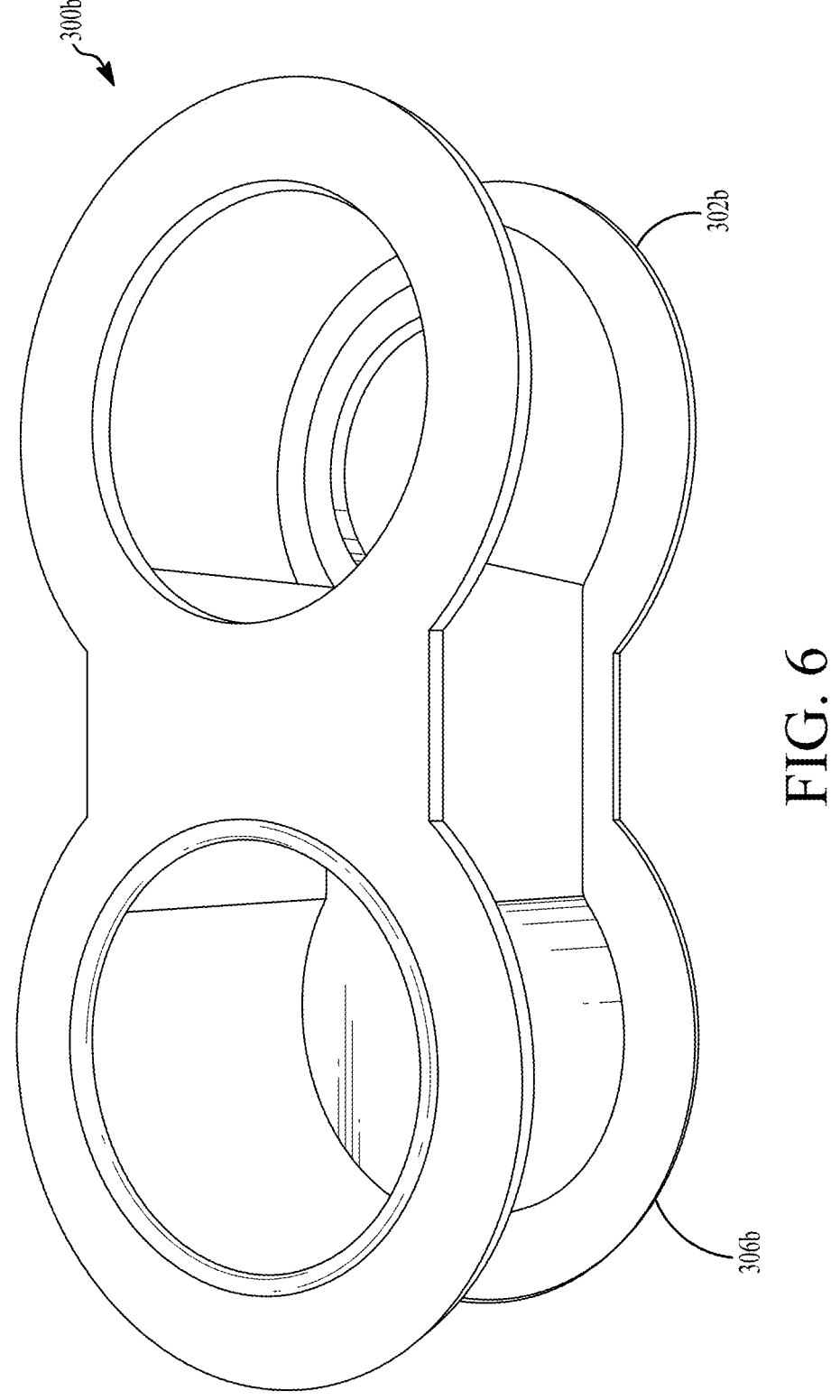
FIG. 6 is another perspective view of the storage tank isolation system.
Figure 7:
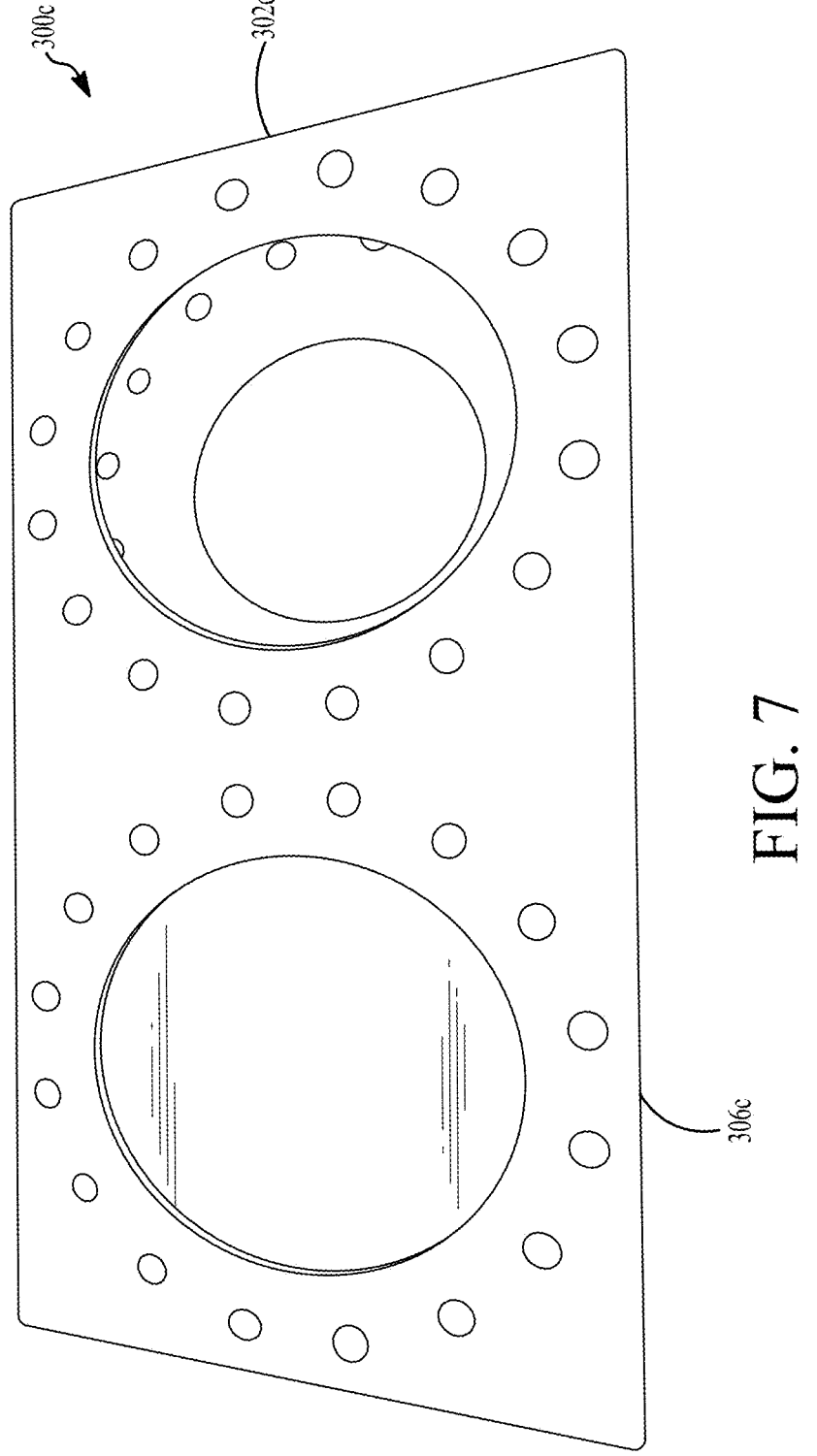
FIG. 7 is another example of a storage tank isolation system.

FIGS. 5-7 are perspective views of several storage tank isolation assemblies 300a, 300b, and 300c. Several examples of the types of configurations between the vertical risers 302a, 302b, 302c and the connecting members 306a, 306b, 306c are shown in FIGS. 5-7. In FIG. 5, the vertical riser 302a is a long hollow cylinder, and the connecting member 306a is a hollow J-shape that extends from the middle or side wall of the vertical riser 302a so that a portion of vertical riser 302a extends above and below where the connecting member 306a contacts the vertical riser 302a. In FIG. 6, the vertical riser 302b is a hollow cylinder, and the connecting member 306b is a hollow cylinder that connects to the vertical riser 302b at a hollow box between the vertical riser 302b and the connecting member 306b. In FIG. 7, the vertical riser 302c and the connecting member 306c form a contiguous rectangular box form.

The connecting member 306 has a flange 320 that is connected to a flange 322 on the hatch 308. The flanges 320, 322 are bolted together via holes that align to receive bolts to couple the two together. Alternatively, a clamp 318 such as those shown in FIGS. 3 and 4 can be used to clamp the flanges 320, 322. The clamp 318 can be a single clamp that circumscribes the entire flange 320, 322 or can be multiple clamps. The clamp 318 replaces the need for the bolted connections, which are typically sixteen bolt connections, which require a lot of time an effort to install and remove. Furthermore, over time, the nuts and bolts may degrade when directly contacting the flanges 305, 316 without the clamp 318 such that removing them is extremely difficult without the need for cutting them.

The bottom end 304 of the vertical riser 302 also has an internal valve seat 326. The internal valve seat 326 can be an extension of the flange 305. The top end 328 of the vertical riser 302 also has a flange 330. The flange 330 is attached to a cover 332, which is installed after valve assembly 350 is installed inside the vertical riser 302. The cover 332 is attached to flange 330 with bolts via holes that align to receive bolts to couple the two together. Alternatively, a clamp 318 such as those shown in FIGS. 3 and 4 can be used to clamp the flange 330 and cover 332. The clamp 318 can be a single clamp that circumscribes the entire flange 330 and cover 332 or can be multiple clamps. The clamp replaces the need for the bolted connections, which are typically sixteen bolt connections, which require a lot of time an effort to install and remove. Furthermore, over time, the nuts and bolts may degrade when directly contacting the flanges 305, 316 without the clamp 318 such that removing them is extremely difficult without the need for cutting them.

The flanges 316, 320 and 330 can have raised face connections 324 to allow for better sealing by increasing the force on seal areas. A gasket may also be used between flanges 316 and 305, between flanges 320 and 322 and between flange 330 and cover 332. The raised face connections 324 can be, for example, a hatch liner as disclosed in U.S. Pat. No. 9,802,740. The use of the liner compounds the pressure for a better seal. The number of bolts required to seal the connection may be reduced with the use of the liner. In other examples, the raised face connections 324, may be any type of sealant sufficient to prevent the flow of harmful vapors between the storage tank isolation system 300 and the external environment. For example, the raised face connections 324 may use rubbers, adhesives, primers, welding, tape, closed cell foams, grease, sealant, or any combination thereof.

FIG. 8 is a cross-sectional view of another storage tank isolation system 300. Inside the vertical riser 302 is a valve assembly 350. The valve assembly 350 comprises a stalk or stem 352 on which a valve plate 354 is attached. The valve plate 354 is attached at a distal end of the stem 352 and has a diameter sized such that the valve plate 354 seats on the internal valve seat 326 to seal off the storage tank. The stem 352 extends and is assessable through an aperture 356 in the cover 332. The stem 352 may also be passable or extend through the valve plate 354 into the storage take and may connect with another stem (not shown) or pipe within the storage tank. The aperture 356 is sized to allow the stem 352 to fit in and move through the aperture 356, and a seal, such as packing or rubber, is used to prevent leakage of vapors. For example, the seal assembly 357 may be used at the aperture 356, such as that shown in FIGS. 9, 10, 12, and 15, to obstruct or prevent the leakage of any vapor.

Figure 9:
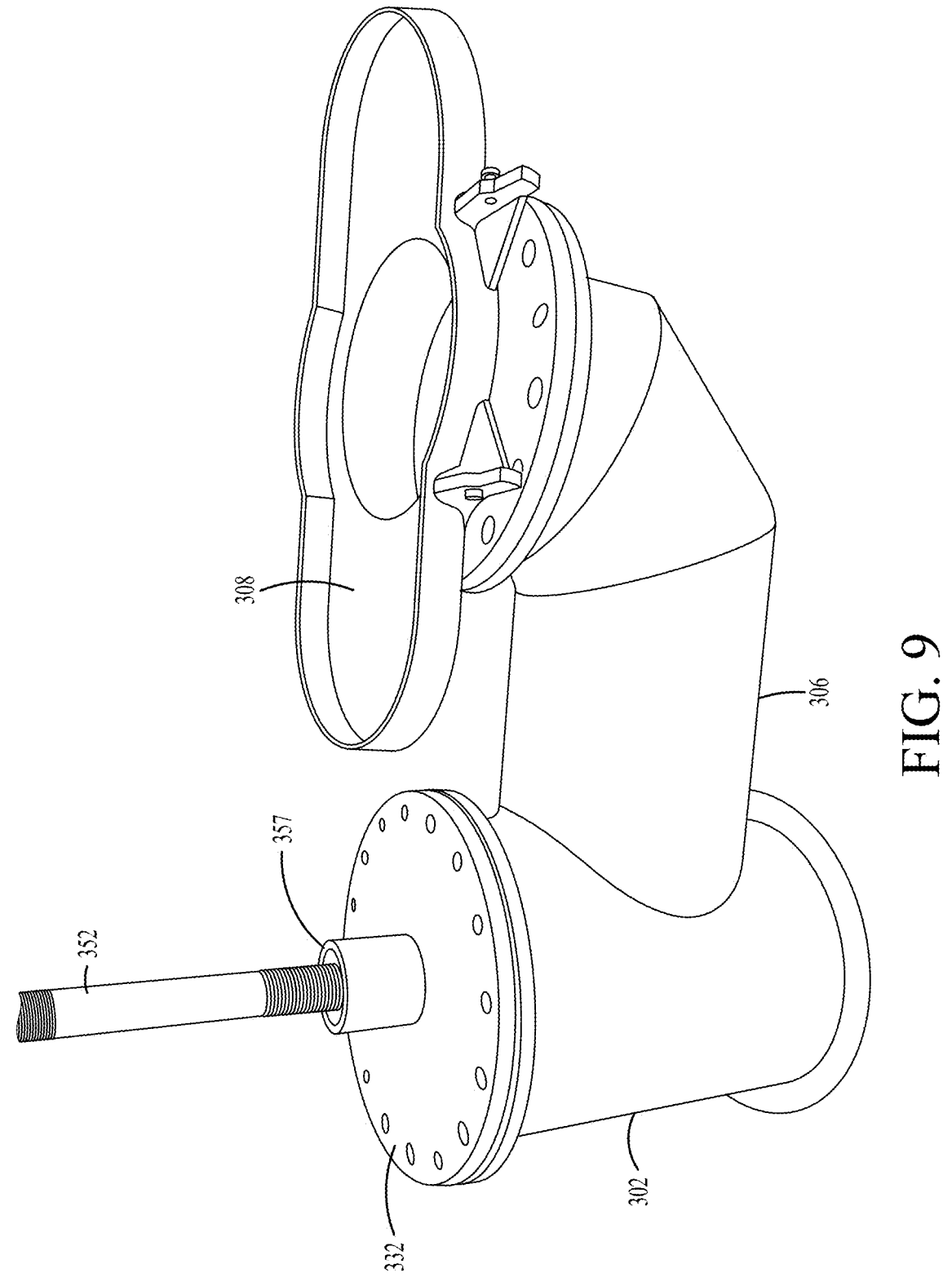
FIG. 9 is a perspective view of the storage tank isolation system.
Figure 10:
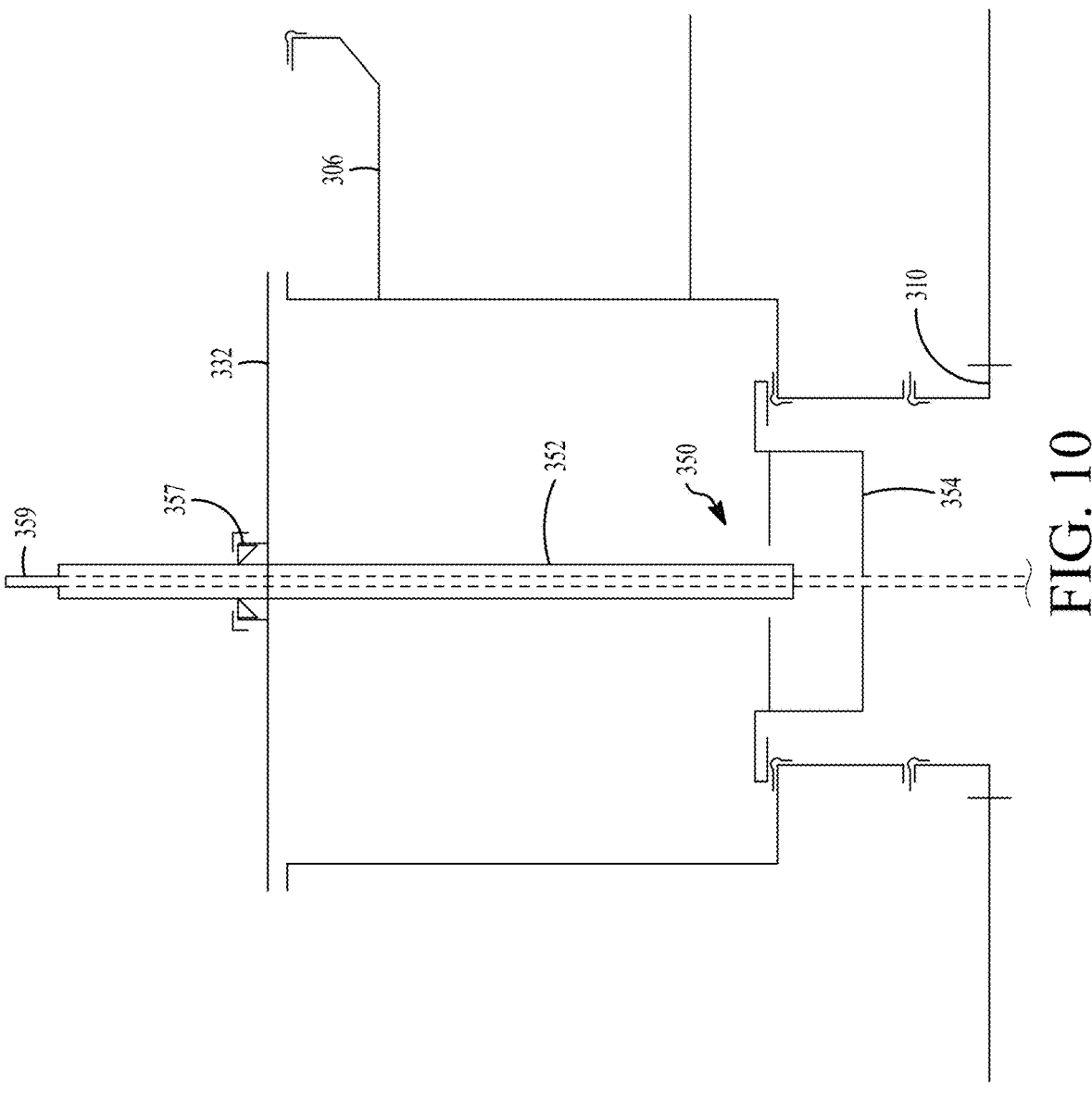
FIG. 10 is a cross sectional view of the vertical riser and the valve system of the storage tank isolation system.

FIG. 9 is a perspective view of the storage tank isolation system 300. The seal assembly 357 may utilize a combination of a threaded connection between the seal assembly 357 and the cover 332 and/or the aperture 356 and a slidable connection between the stem 352 and the seal assembly 357. In the example of a slidable connection between the stem 352 and the seal assembly 357, the stem 352 is movable up and down through the aperture 356 while preventing fluid flow between the inside of the storage tank assembly and an external environment.

FIG. 10 is a cross sectional view of the vertical riser 302 and the valve assembly 350 of the storage tank isolation system 300 of FIGS. 8 and 9. The stem 352 extends through the cover 332 so to be accessible to an operator external to the storage tank. The valve assembly 350 is kept in the open position with the valve plate 354 above the connecting member 306 during normal operation. The hatch 308 and its associated safety relief valve 359 are there to protect the storage tank. When the hatch 308 or the safety relief valve 359 need to be tested, repaired or replaced, the valve assembly 350 is moved to the closed position by lowering the valve plate 354 down to seat on the internal valve seat 326, rotating the valve plate 354 slighted at the point of contact with the valve seat 326 to ensure a tight seal.

Figure 11:
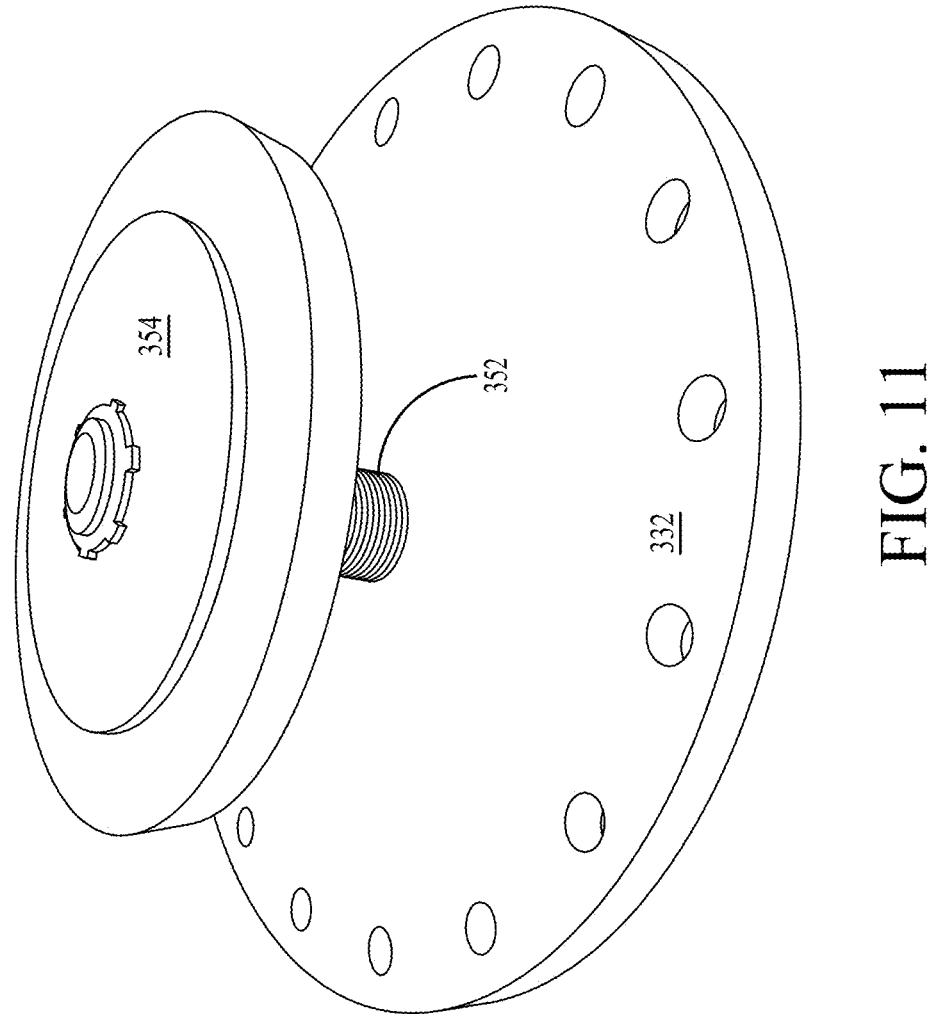
FIG. 11 is a bottom perspective view of a valve plate and cover.

FIG. 11 is a bottom perspective view of the valve plate 354 and cover 332 in the storage tank isolation system 300 of FIGS. 8-10. The valve plate 354 can be attached to the stem 352 with threads that are interfaceable with mating threads on the valve plate 354 as illustrated in FIG. 11 or can be attached in any other manner known to those skilled in the art that would allow the stem 352 and the valve plate 354 to be secured and movable, such as welding, adhesive, a bolt connection, a clamp, or any other mechanical connection. The valve plate 354 may have a staggered structure comprising one or more plates so that the valve plate 354 can create a better seal with the valve seat 326.

Figure 12:
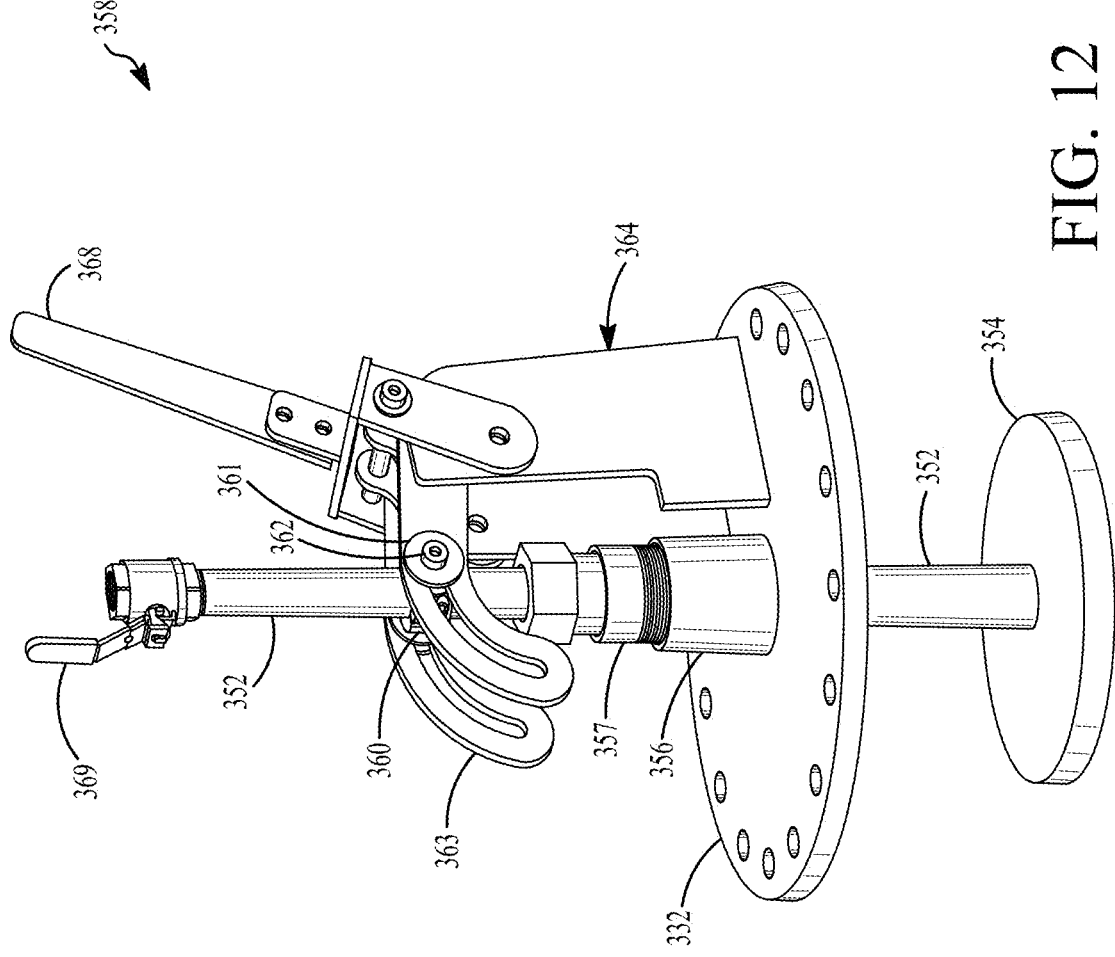
FIG. 12 is a perspective view of a latch assembly.

FIG. 12 is a perspective view of a latch assembly 358 that is usable with the storage tank isolation systems 300 of FIGS. 3-10. The valve plate 354 is held in the open position, for example, using the latch assembly 358. As illustrated in FIG. 12, the stem 352 includes a fixed collar 360 that is positioned on the stem 352 such that when the fixed collar 360 is engaged with washers 361 and bolts 362 of a rail path 363 the valve plate 354 is openable, above the opening to the connecting member 306. The valve plate 354 is moved to an open position or a closed position by an operator who adjusts a handle 368 so that the stem 352 moves through the aperture 356 in the cover 332 until the valve plate 354 contacts or rises above the valve seat 326. Supports 364 are connected with the rail path 363 and the handle 368 by any connectable means, such as bolts, so that the stem 352 is adjustable when the handle 368 is moved. When the handle 368, the rail path 363 slides along the bolts 362 and washers 361 towards the supports 364 and, simultaneously, the stem 352 is moved. The fixed collar 360 and the supports 364 are positioned above the storage tank so that there is enough stem 352 to move through the aperture 356 to allow for the valve plate 354 to seat before the fixed collar 360 comes in contact with the packing at the aperture 356. When the valve plate 354 is seated on the valve seat 326, the storage tank is isolated and the vapor in the storage tank is contained. The hatch and/or relief valve 369 can then be opened for repairs, replaced, tested for integrity, etc.

In another example of a latch assembly 358, the fixed collar 360 is positioned on the stem 352 such that, when the fixed collar 360 is engaged with a spring latch (not shown), the valve plate 354 is openable, above the opening to the connecting member 306. The valve plate 354 is moved to a closed position by an operator who lifts the stem manually enough to release the spring latch (not shown) so that the stem 352 moves through the aperture 356 in the cover 332 until the valve plate 354 seats on the valve seat 326. In this configuration, to lift the valve plate 354 back up to the open position once the hatch and/or the relief valve are back in operation, the stem 352 having a smooth outer surface can be moved through the aperture 356 using a ratchet lever assembly (not shown) that engages a washer around the stem, the ratchet lever assembly having a handle, which is similar to the handle 368 of FIG. 8, that the operator uses to move the stem 352 using the washer in increments until the fixed collar 360 is at a position to engage with a spring latch to hold the valve plate in the open position. In this configuration, the spring latch can be moved between a secured position that is associated with the open position of the stem 352 and an unsecured portion that is associated with the closed position of the stem 352.

The stem 352 can be a solid piece. In some embodiments, the stem 352 can be hollow, like a pipe, as illustrated in FIG. 10. The stem 352 may include the relief valve 369 for controlling access to the stem 352 so that the fluid content of the storage tank isolation system 300, the storage tank, or both is testable, as shown in FIG. 12. Alternatively, the stem 352 can have a cover that can be removed to allow the safety relief valve 359 to be inserted to measure the liquid height in the storage tank. Conventionally, the entire hatch would need to be opened, releasing vapor during the storage tank gauging procedure. Utilizing the much smaller opening of the stem 352 significantly cuts down on vapor released during the storage tank gauging process. To completely eliminate vapor escaping during the storage tank gauging process, the stem 352 can extend into the liquid into the storage tank. This seals the stem 352 from the vapors and allows for gauging the liquid height without the release of any vapors.

Figure 13:
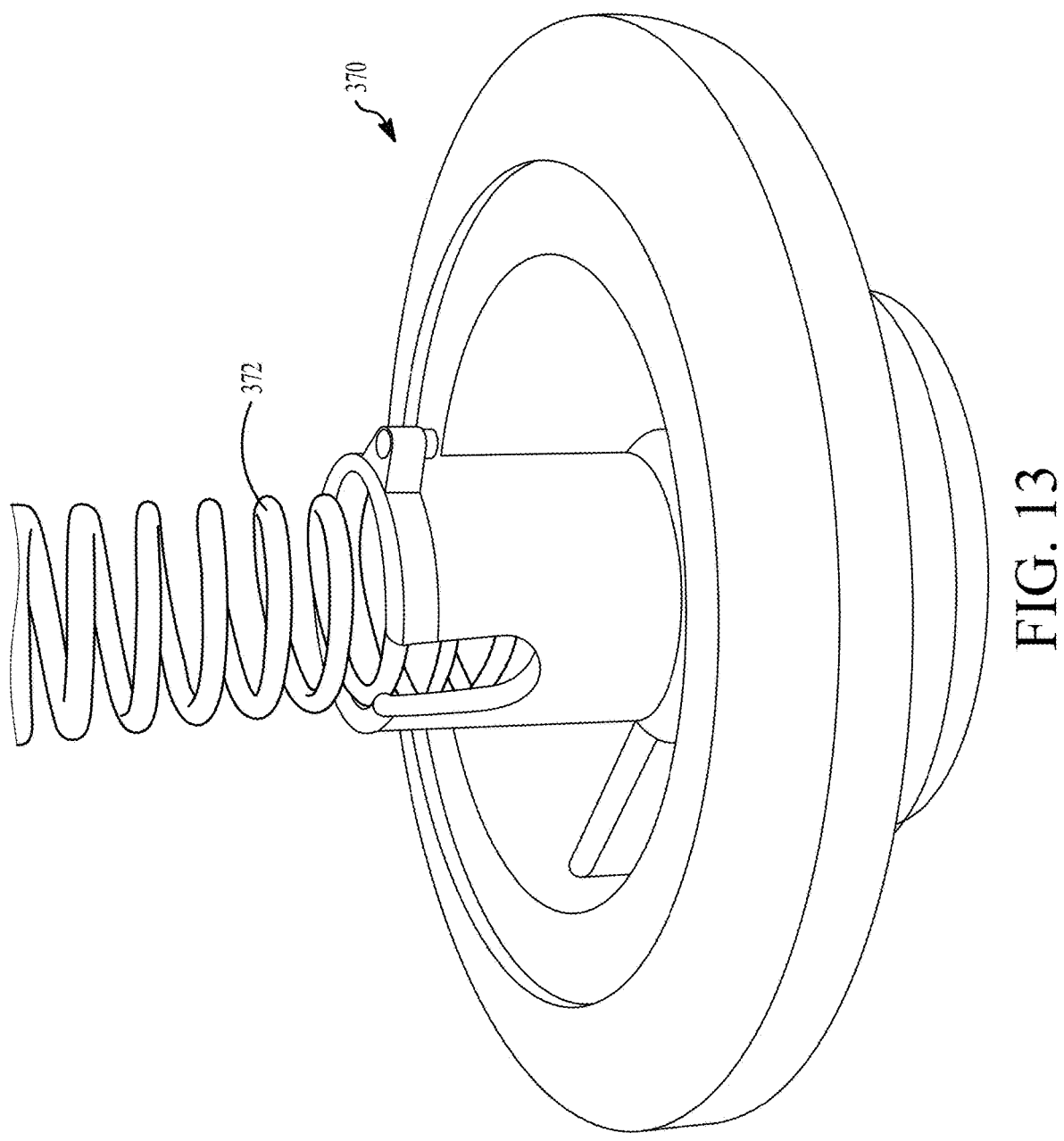
FIG. 13 is a perspective view of a pressure relief valve.

FIG. 13 is a perspective view of a pressure relief valve 370. The valve assembly 350 is the pressure relief valve 370 that will relieve the storage tank if ever needed while the storage tank is in isolation. In this example, no storage tank gauging could be done through the stem. When a pressure relief valve 370 is used, the vertical riser 302 can have a wider diameter than the opening 310 in the storage tank as shown in FIG. 8. Using a pressure relief valve 370, rather than a valve plate 354, allows for the storage tank pressure to be released in a situation when the storage tank pressure increases above a safe level while the hatch and/or hatch relief valve are under repair/replacement. The pressure relief valve 370 would have a spring 372 in the stem 352 of the valve assembly 350 that will be compressed a specific amount to provide the rated pressure at which the valve will relieve. When the spring 372 is compressed the necessary amount, a second spring latch (not shown) can be used to engage the fixed collar 360 on the stem 352 to maintain the compression.

Figure 14:
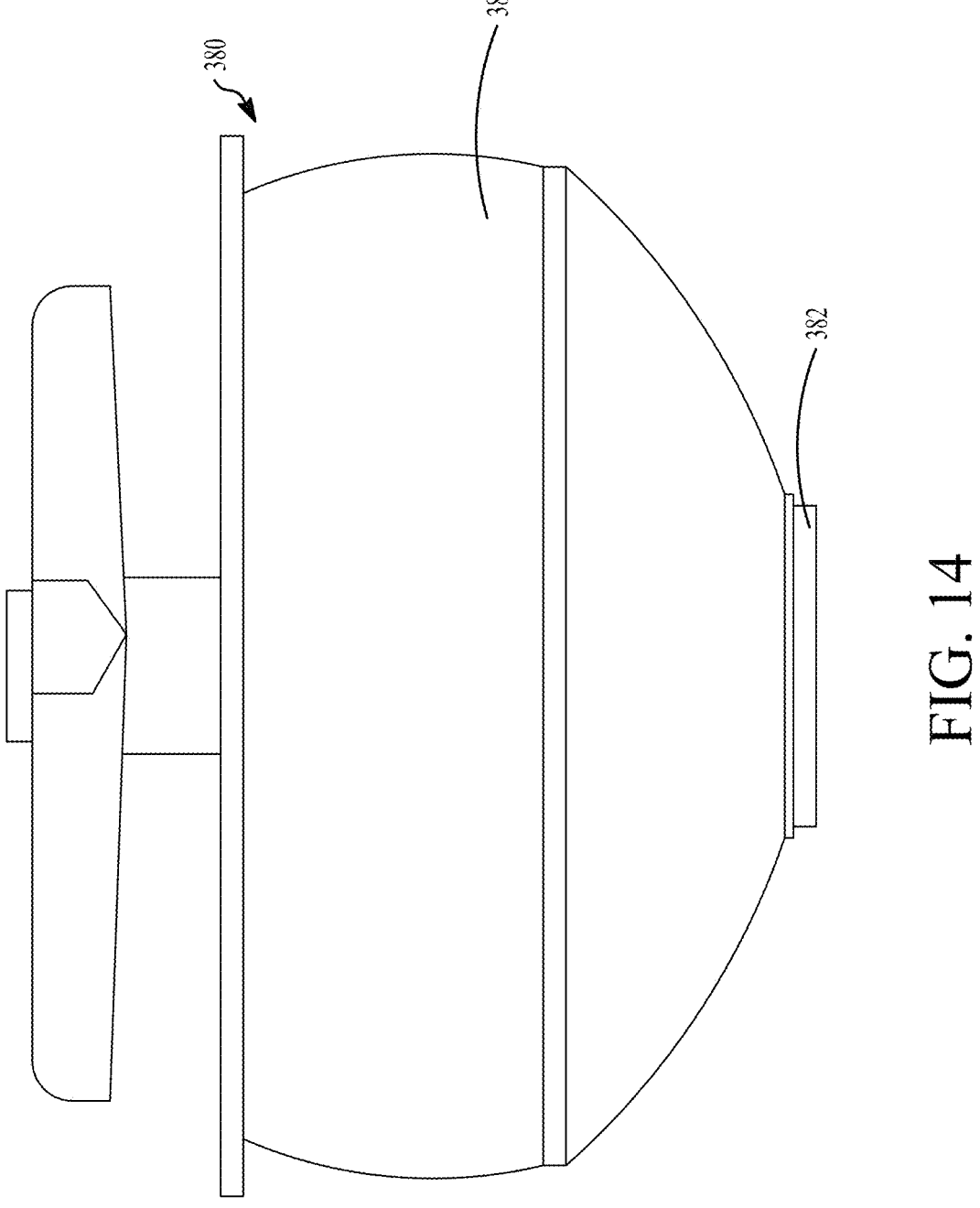
FIG. 14 is a perspective view of a plug.

FIG. 14 is a perspective view of a plug 380. Another alternative to the valve plate 354 is the use of the plug 380. The distal end of the stem 352 would be connected to the underside 382 of the plug 380. The plug 380 is sized to tightly friction fit within the circular opening 384 of the valve seat 326. When the plug 380 is lowered such that the plug portion 386 is tightly circumscribed by the valve seat 326, the stem 352 is pulled up to pull up the underside 382 of the plug 380, squeezing and expanding the plug portion 386 to tightly seal the opening 384.

Figure 15:
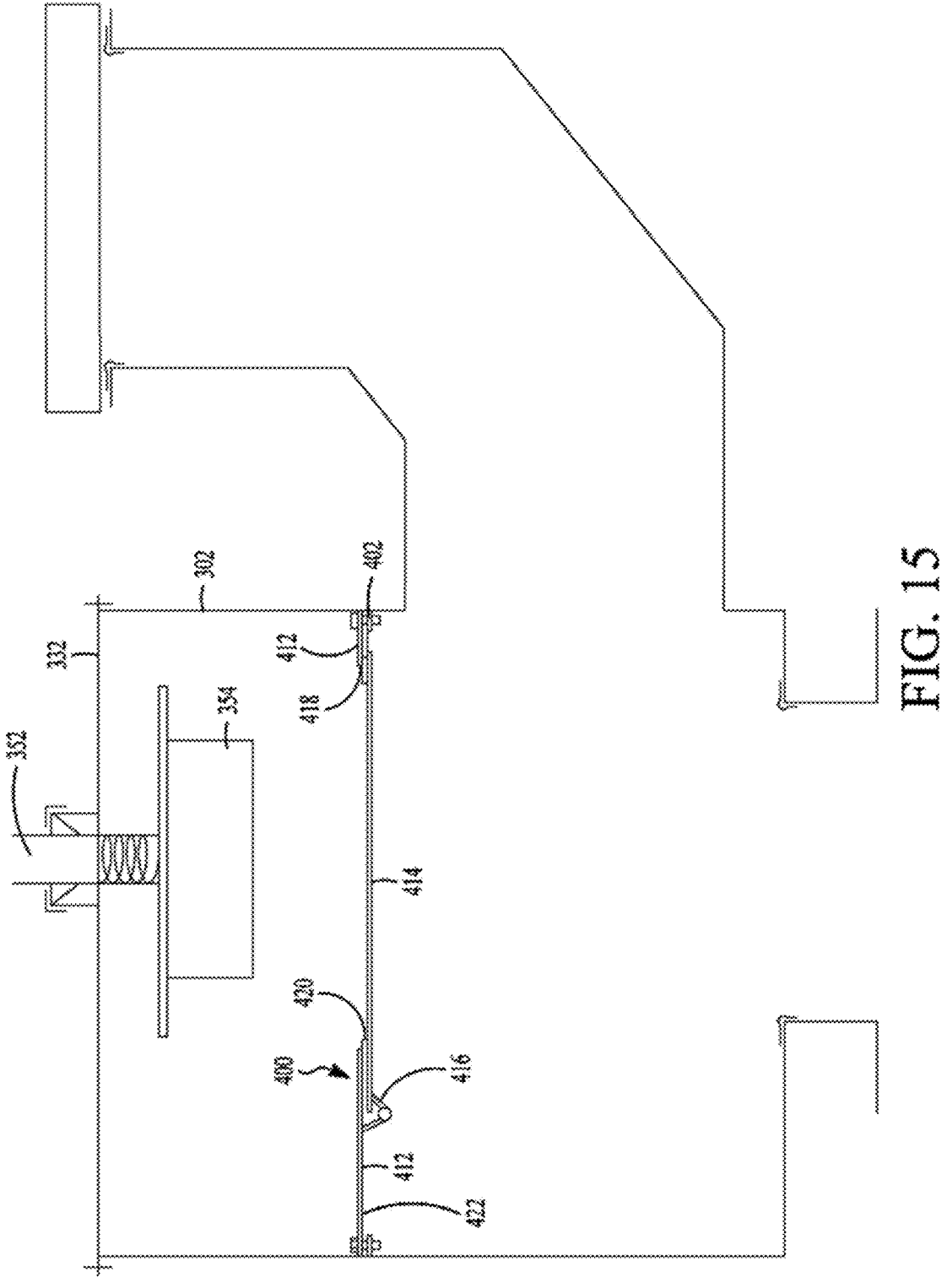
FIG. 15 is a cross sectional view of a storage tank isolation valve with an isolation flapper valve.

FIG. 15 is a cross sectional view of a storage tank isolation system 300 with an isolation flapper valve 400. The isolation flapper valve 400 can be used to isolate the storage tank so that the valve plate 354, the pressure relief valve 370, or the plug 380 of the storage tank isolation system 300 can be serviced. The isolation flapper valve 400 is a spring loaded valve or check that is designed to sit in the top of the vertical riser 302 above the connecting member 306. The space between the cover 332 of the vertical riser 302 and the isolation flapper valve 400 is sufficiently large to accommodate the valve plate 354, the plug 380, or the pressure relief valve 370 and the end of the stem 352 between the two, approximately 6" to 12". The isolation flapper valve 400 allows access to move the valve plate 354, the pressure relief valve 370, or the plug 380 into the space between the isolation flapper valve 400 and the cover 332. When the isolation flapper valve 400 is closed, the cover 332 can then be opened to allow access to the valve plate 354, the pressure relief valve 370, or the plug 380 for service while the isolation flapper valve 400 prevents emissions or vapors from the storage tank from escaping.

As illustrated in FIG. 15, a retainer ring 402 is positioned in the vertical riser 302 above the connecting member 306. The retainer ring 402 is fixed, such as by welding, to the vertical riser 302. The isolation valve 410 has a fixed portion 412 and a movable check plate 414, shown in plan view in FIG. 16. The fixed portion 412 is attached to the retainer ring 402 with bolts, for example. A gasket can be used between the retainer ring 402 and the fixed portion 412. Both the retainer ring 402 and the fixed portion 412 are continuous circular plates and the engagement between the retainer ring 402 and the fixed portion 412 is sealed such that no fluid from above or below passes.

The check plate 414 is attached to the fixed portion 412 at a hinge portion 416. The hinge portion 416 is spring loaded and biases the check plate 414 into the closed position to seal the opening 418 in the fixed portion 412 that allows for the valve plate 354, the pressure relief valve 370, or the plug 380 to pass. Another gasket 420 can be positioned on the top of the check plate 414 such that the gasket 420 forms a vapor tight, disconnectable seal between the check plate 414 and the fixed portion 412 when the check plate 414 is in the closed position. The storage tank pressure itself, typically up to about 10 oz. of pressure, will also assist in sealing the check plate 414.

Figure 16:
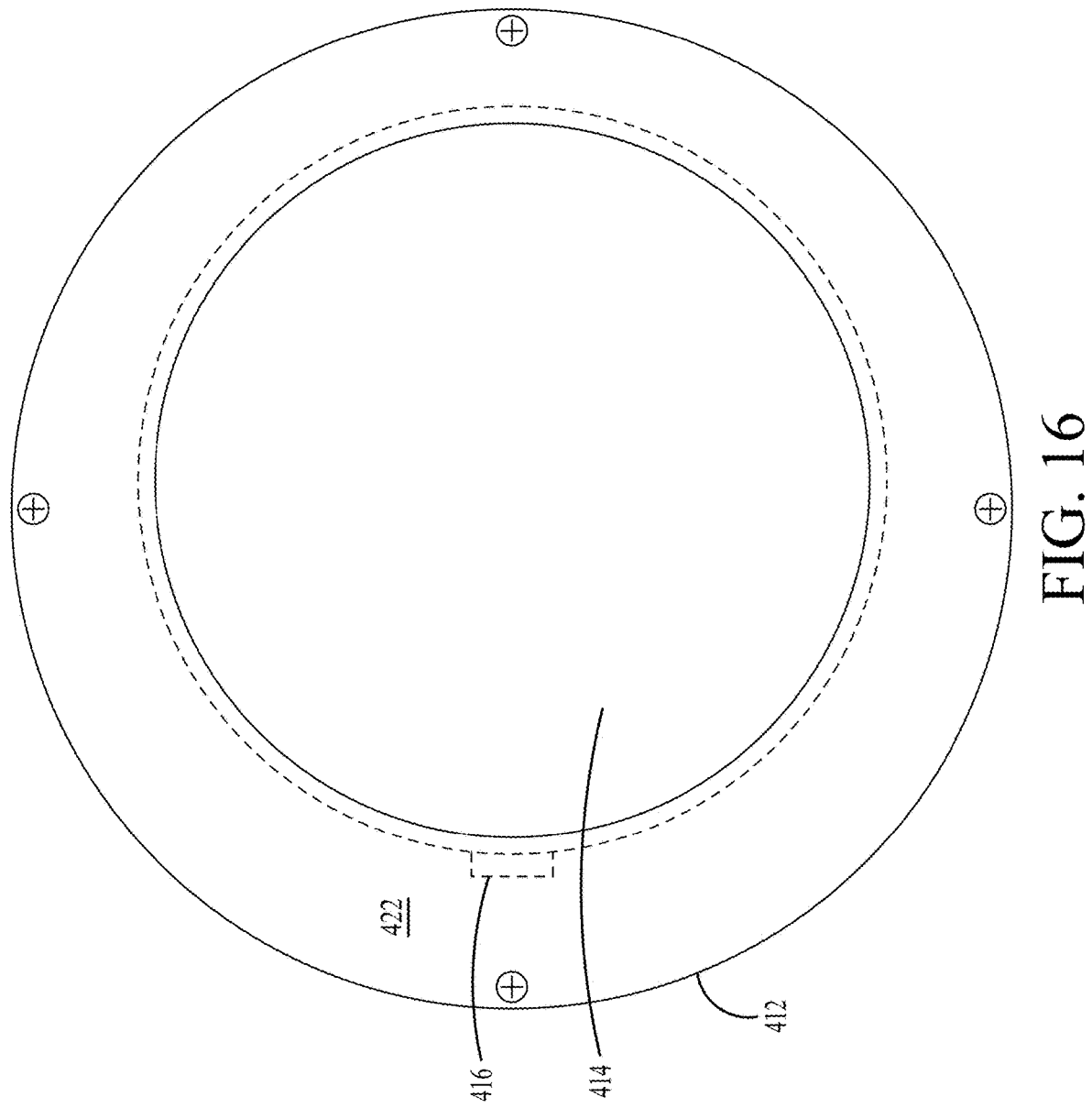
FIG. 16 is a plan view of the isolation flapper valve.

FIG. 16 is a plan view of the isolation flapper valve 400. The opening 418 and the fixed portion 412 may be offset relative to a central axis of the fixed portion 412 as illustrated rather than centralized in the fixed portion 412, with the area 422 away from which the opening is offset allowing for space for the check plate 414 to sit when in the open position. In other examples, the fixed portion 412 and the opening 418 may be substantially symmetrical.

When the valve assembly 350 of the storage tank isolation system 300 is to be used, the valve plate 354, the pressure relief valve 370, or the plug 380 is moved to the isolating position against the valve seat 326 (e.g., FIGS. 8-10), moving against the check plate 414 to move the check plate 414 to the open position. An equalizing valve can be used on the isolation flapper valve 400 to equalize the pressure under the flapper valve with the pressure above to allow for the check plate 414 to move. The valve plate 354, the pressure relief valve 370, or the plug 380 move through opening 418 until one of the valve plate 354, the pressure relief valve 370, or the plug 380 is seated on the valve seat 326. At this time, the storage tank is sealed and the hatch, such as the hatch 308 of FIG. 3, and/or hatch relief can be repaired or replaced. When the hatch and hatch relief are ready for use, the valve plate 354, the pressure relief valve 370, or the plug 380 is moved back up through the vertical riser 302 and through the opening 418 in the isolation flapper valve 400 until the check plate 414 is firmly sealed against the fixed portion 412. The valve assembly 350 can simply be stored in place for future use or can be inspected/repaired/replaced by removing the cover 322 of the vertical riser 302. No vapors are emitted due to the isolation flapper valve 400. The valve plate 354, the pressure relief valve 370, or the plug 380 may be swapped out with other attachments that can perform other functions. For example, a cleaning plate can be placed on the stem that has an abrasive cloth or surface that can be used to clean the valve seat of debris to ensure a good seal.

In an alternative example that is not illustrated, a hatch assembly (not shown) for a storage tank comprises a hatch having a rim adapted to engage with a gasket within a cover, a neck extending vertically downward from the rim to define an aperture that provides access to an inside of the storage tank, and a flange having a bolt hole pattern configured to attach to the API storage tank. An isolation valve is positioned between the hatch and the storage tank, the isolation valve having a valve body with a valve seat and a flange at each end of the valve body, each flange having a bolt hole pattern configured to attach to the storage tank, the isolation valve configured to isolate an interior of the storage tank from the hatch. A test tap is located on the isolation valve downstream of the valve seat. The test tap can be used to test the vapor in the storage tank, for example. The test tap can alternatively be a pressure tap. Additional pressure can be introduced through the pressure tap to test the pressure relief valve of the hatch, which is configured to release vapors from the storage tank or storage tank isolation assembly at a predetermined pressure threshold. The additional pressure can also be used to test the seal on the hatch.

The isolation valve can be a manual valve and can be any type of valve suitable to remain in a fully open position and a fully closed position. The isolation valve can lock in an open position to allow flow to the hatch while the storage tank is in use. The bolt hole pattern on each flange of the isolation valve has sixteen ½ inch bolt holes on a 10⅜" center pattern. However, other combinations and sizes of bolt holes, bolt hole patters, flanges, or any combination thereof are usable in these implementations. Alternatively, at least one flange of the isolation valve can include an adapter having a bolt hole pattern of sixteen ½ inch bolt holes on a 10⅜" center pattern, configured to attach the isolation valve to a flange on the storage tank or the flange on the hatch.

The foregoing description relates to what are presently considered to be the most practical embodiments, but it is to be understood that the disclosure is intended to cover various modifications and equivalent arrangements. The scope of the claims is thus to be accorded the broadest interpretation so as to encompass all such modifications and equivalent structures as is permitted under the law.

What is claimed is:

1. A storage tank hatch isolation system for a storage tank, comprising:
   a vertical riser attached to a top of the storage tank and having a cover with an aperture;
   a connecting member extending from a side of the vertical riser, a distal end of the connecting member being attached to a tank hatch; and
   a valve assembly assessable through the aperture in the cover, the valve assembly configured to be moved from an open position in which flow through the vertical riser to the connecting member is not obstructed, and a closed position in which flow through the vertical riser to the connecting member is obstructed.

2. The storage tank hatch isolation system of claim 1, wherein the tank hatch comprises a pressure relief valve configured to release vapors from the storage tank at a pressure threshold,
   wherein, when the valve assembly is in the closed position, the tank hatch, the pressure relief valve, or both are testable, replaceable, or repairable without releasing vapors from the storage tank.

3. The storage tank hatch isolation system of claim 1, wherein the vertical riser includes a seal assembly interfacing with the aperture so that vapors are sealed within the storage tank hatch isolation system.

4. The storage tank hatch isolation system of claim 1, further comprising:
   an intermediate connector fluidly connecting the vertical riser and the storage tank so that the vertical riser and the storage tank are spaced a distance apart.

5. The storage tank hatch isolation system of claim 4, further comprising:
   an isolation valve contacting an external surface of the intermediate connector and configured to test fluids of the storage tank hatch isolation system, the storage tank, or both.

6. The storage tank hatch isolation system of claim 1, wherein the valve assembly comprises:
   a stem extending through the aperture in the cover;
   a valve plate attached to the stem; and
   a valve seat sealed to the vertical riser at a position below a connection to the connecting member,
   wherein the valve plate is held within the vertical riser at a position equal to or above the connection to the connecting member, and a closed position in which the valve plate is on the valve seat to isolate the storage tank.

7. The storage tank hatch isolation system of claim 6, wherein the stem comprises:
   a second cover that is openable and interfaced with the distal end of the stem, wherein the stem is hollow so that, when the second cover is open, a safety relieve valve is interfaceable to test contents of the storage tank.

8. The storage tank hatch isolation system of claim 6, wherein the stem is sealed and extendable into the storage tank so that contents of the storage tank are testable without releasing any vapors.

9. The storage tank hatch isolation system of claim 6, wherein the stem and the valve seat are threadedly connected so that, when the valve plate is in contact with the valve seat, rotating the stem creates a tight seal.

10. A system configured to isolate a tank hatch from a storage tank, the system comprising:
   a vertical riser configured to be attached to a top of the storage tank and having a cover with an aperture;
   a connecting member configured to extend between the vertical riser and the tank hatch;
   a valve assembly assessable through the aperture; and
   a lever assembly configured to move the valve assembly from an open position in which the vertical riser is not obstructed at a position equal to or below a connection to the connecting member, and a closed position in which the vertical riser is obstructed at the position equal to or below the connection to the connecting member to isolate the storage tank.

11. The system of claim 10, wherein the lever assembly comprises:
   a fixed collar contacting a portion of the valve assembly;
   a rail path with a sliding connection on the fixed collar; and
   a lever contacting the rail path and configured to slide the rail path along the fixed collar,
   wherein, when the lever slides the rail path along the fixed collar, the valve assembly is movable between the open position and the closed position.

12. The system of claim 10, wherein the lever assembly comprises:

a fixed collar contacting a portion of the valve assembly;

a spring latch secured to a top surface of the cover; and a lever contacting the fixed collar and configured move the fixed collar on the spring latch between a secured position and an unsecured position.

13. The system of claim 12, wherein the secured position is associated with the open position of the valve assembly, and wherein the unsecured position is associated with the closed position of the valve assembly.

14. The system of claim 10, further comprising:

a seal assembly sealing the valve assembly within the aperture so that a release of vapors is prevented through the aperture when the valve assembly is moved between the open position and the closed position.

15. A storage tank hatch isolation system, comprising:

a vertical riser attached to a top of a storage tank and having a cover with an aperture;

a connecting member extending between the vertical riser and a tank hatch; and a valve assembly, comprising:

a stem extending through the aperture in the cover;

a valve plate attached to the stem;

a valve seat attached to the vertical riser at a position equal to or below an opening to the connecting member;

wherein the valve plate is held within the vertical riser at a position equal to or above the opening to the connecting member, and a closed position in which the valve plate is on the valve seat to isolate the storage tank.

16. The storage tank hatch isolation system of claim 15, further comprising:

a fixed portion attached to the vertical riser at a position above the opening to the connecting member; and a check plate rotatably connected to the fixed portion and configured to be openable so that the stem is passable through the fixed portion, wherein the valve plate is configured to be moved with the stem from the open position in which the valve plate is held at a position above the fixed portion and the check plate, and the closed position in which the valve plate is on the valve seat to isolate the storage tank.

17. The storage tank hatch isolation system of claim 16, wherein the valve assembly further comprises:

a hinge portion that assists the check plate to rotate relative to the fixed portion; and a retainer ring that provides a disconnectable fluid seal between the fixed portion and the check plate.

18. The storage tank isolation system of claim 15, wherein the vertical riser further comprises:

an equalizing valve secured to an external wall of vertical riser at a position below the cover and above the opening to the connecting member.

19. The storage tank isolation system of claim 16, wherein the fixed portion is a circular rim extending along an inside wall the vertical riser, and wherein the check plate is off centered relative to a central axis of the fixed portion, the vertical riser, or both.

20. The storage tank isolation system of claim 16, wherein, when the check plate is in the closed position, the stem, the cover, the valve plate, or any combination thereof are removeable without releasing any vapors from the storage tank so that the stem, the cover, the valve plate, or any combination thereof are inspectable.

\*   \*   \*   \*   \*